United States Patent
Naveh

(10) Patent No.: US 9,329,961 B2
(45) Date of Patent: *May 3, 2016

(54) TESTING DEVELOPMENT USING REAL-TIME TRAFFIC

(71) Applicant: Facebook, Inc., Menlo Park, CA (US)

(72) Inventor: Barak Reuven Naveh, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/500,452

(22) Filed: Sep. 29, 2014

(65) Prior Publication Data

US 2015/0058673 A1 Feb. 26, 2015

Related U.S. Application Data

(63) Continuation of application No. 13/602,648, filed on Sep. 4, 2012, now Pat. No. 8,880,949.

(51) Int. Cl.
| | |
|---|---|
| *G06F 11/00* | (2006.01) |
| *G06F 11/263* | (2006.01) |
| *G06F 11/273* | (2006.01) |
| *G06F 11/36* | (2006.01) |

(52) U.S. Cl.
CPC .......... *G06F 11/263* (2013.01); *G06F 11/2733* (2013.01); *G06F 11/3684* (2013.01)

(58) Field of Classification Search
USPC ...................... 714/33, 32, 45, 25.46
See application file for complete search history.

(56) References Cited

U.S. PATENT DOCUMENTS

| | | | | |
|---|---|---|---|---|
| 4,972,365 A | * | 11/1990 | Dodds ................. | G05B 19/054 700/7 |
| 6,154,715 A | * | 11/2000 | Dinteman ........ | G01R 31/31917 702/117 |
| 7,539,489 B1 | * | 5/2009 | Alexander ............ | H04W 24/06 370/241 |
| 8,880,949 B2 | * | 11/2014 | Naveh ................. | G06F 11/3684 714/32 |

* cited by examiner

*Primary Examiner* — Dieu-Minh Le
(74) *Attorney, Agent, or Firm* — Van Pelt, Yi & James LLP

(57) ABSTRACT

Testing a test component is disclosed. A real-time input communication that has been forked from an input communication intended for a deployed component is received at the test component. At least a portion of the received real-time input communication is processed. A result of the processing is used to at least in part determine a test result of the test component.

20 Claims, 5 Drawing Sheets

TESTING DEVELOPMENT USING REAL-TIME TRAFFIC

CROSS REFERENCE TO OTHER APPLICATIONS

This application is a continuation of co-pending U.S. patent application Ser. No. 13/602,648, entitled TESTING DEVELOPMENT USING REAL-TIME TRAFFIC filed Sep. 4, 2012 which is incorporated herein by reference for all purposes.

BACKGROUND OF THE INVENTION

Testing development devices and systems often require a test input data to test a desired attribute of the device or system. For example when developing a server system, a test input including a sequence of server requests may be used to test the server being developed. Traditionally, a developer manually generated a test input data. However, the required test input data may be too large, difficult, or time consuming for a developer to manually generate the input data. For example, in order to stress test a server, a test input data, including simulated server requests from millions of users, may be desired. In some cases, it may be desired to test a component of a larger system or a network of systems without connecting the component being tested to the larger system or network. For example, it may be desired to sandbox a new version of a server before the new server is deployed. In this case, it may be difficult to manually generate a test input data that takes into account independencies with other systems/components in the larger deployed system or network. Therefore, there exists a need for a more effective way to generate test input data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Testing a component is disclosed. Examples of the component include a server, a system, a device, a network component, and any other software or hardware component or system. In some embodiments, real-time communications that have been forked from communications intended for a deployed component are received at the component being tested. For example, a new version of a currently deployed server is being developed and tested and user requests being sent to the deployed server for processing are copied and forwarded in real-time to the new version of the server being developed and tested. At least a portion of the received communication is processed by the component being tested. A result of the processing is at least in part used to determine a test result of the test component. In various embodiments, the test result is associated with one or more of the following: a verification of correct functionality of the component, an error log, a code coverage, and a performance metric.

Figure 1:
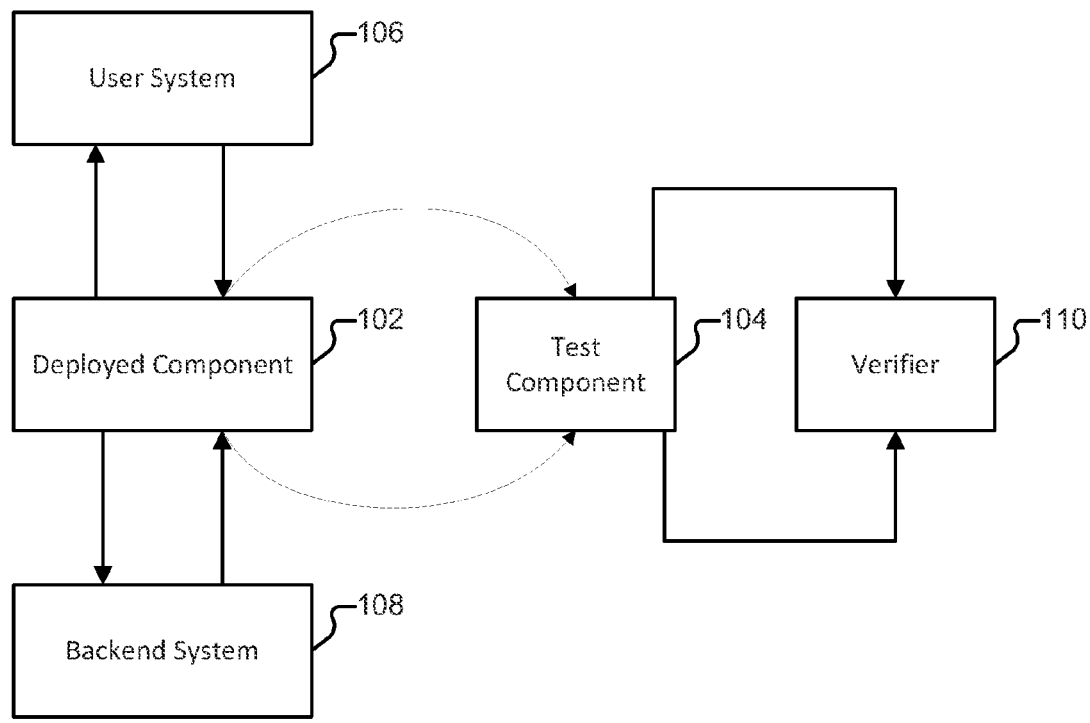
FIG. 1 is a block diagram illustrating an embodiment of an environment for testing a component.

FIG. 1 is a block diagram illustrating an embodiment of an environment for testing a component. Test component 104 is a component being tested. Examples of test component 104 include any software or hardware server, system, device, or component. For example, test component 104 includes a network server. Deployed component 102 is a component that has been deployed and is currently in use. For example, deployed component 102 is a server currently being used to provide a networked service. Examples of deployed component 102 include any software or hardware server, system, device, and/or component. In some embodiments, test component 104 is a developmental version of deployed component 102. User system 106 communicates with deployed component 102 to access data and/or service provided by deployed component 102. For example, user system 106 requests content from deployed component 102 and deployed component 102 provides the requested content. Deployed component 102 accesses backend system 108 to provide and/or obtain content and/or services required to process communication from user system 106. For example, deployed component 102 requests content from backend system 108 in order to process a request from user system 106. Backend system 108 provides the requested content to deployed component 102.

Test component 104 is tested using forked communication provided substantially in real-time from input communication provided to deployed component 102 from user system 106 and/or backend system 108. For example, user requests from user system 106 to deployed component 102 are forked to test component 104. In some embodiments, forking information includes providing a communication to a new recipient while still allowing the communication to arrive at the originally intended destination. In some embodiments, the forked communication is sent by deployed component 102 to test component 104. In some embodiments, the forked communication is set to test component 104 by an intermediary component between a communication path between deployed component 102 and user system 106 and/or backend system 108 (e.g., an intermediary networking component). In some embodiments, the forked communication is directly sent by user system 106 and/or backend system 108 to test component 104. In some embodiments, the forked communication is sent by a component that is monitoring user system 106, deployed component 102, and/or backend system 108.

The user request is received at test component 104 and processed by test component 104 as if the user request was requested by user system 106 directly to test component 104. Test component 104 is sandboxed and isolated from elements of a deployed system environment (e.g., no outgoing command/information to the deployed system environment) to prevent test component 104 from adversely affecting the deployed system environment (e.g., not affecting user system 106, deployed component 102, and backend system 108). Processing the received user request may require test component 104 to obtain data from a backend system such as backend system 108. Because deployed system 102 is also processing the request from user system 106, it has already requested backend system 108 for the data. The response provided by backend system 108 to deployed component 102 is forked and provided to test component 104. Although test component 104 may have separately issued a request for the data, this request is not actually issued to backend system 108 because test component 104 has been isolated and sandboxed. Verifier 110 receives one or more outputs (e.g., processing result, response to user system 106, request to backend system 108, error log, performance metric, etc.) of test component 104 and/or monitors test component 104 to determine a test result. In some embodiments, test component 104 and verifier 110 are included in the same physical system.

In the example shown in FIG. 1, portions of the communication path between the elements are shown. Other communication paths may exist and the example of FIG. 1 has been simplified to illustrate the example clearly. The elements of FIG. 1 may communicate with another element via a network. Examples of the network include one or more of the following: a direct or indirect physical communication connection, mobile communication network, Internet, intranet, Local Area Network, Wide Area Network, Storage Area Network, and any other form of connecting two or more systems, components, or storage devices together. Additional user systems may communicate with deployed component 102. Deployed component 102 may utilize one or more additional backend systems. Test component 104 may receive forked data/information/request from one or more other deployed components. Any number of components shown in FIG. 1 may exist. Components not shown in FIG. 1 may also exist.

Figure 2:
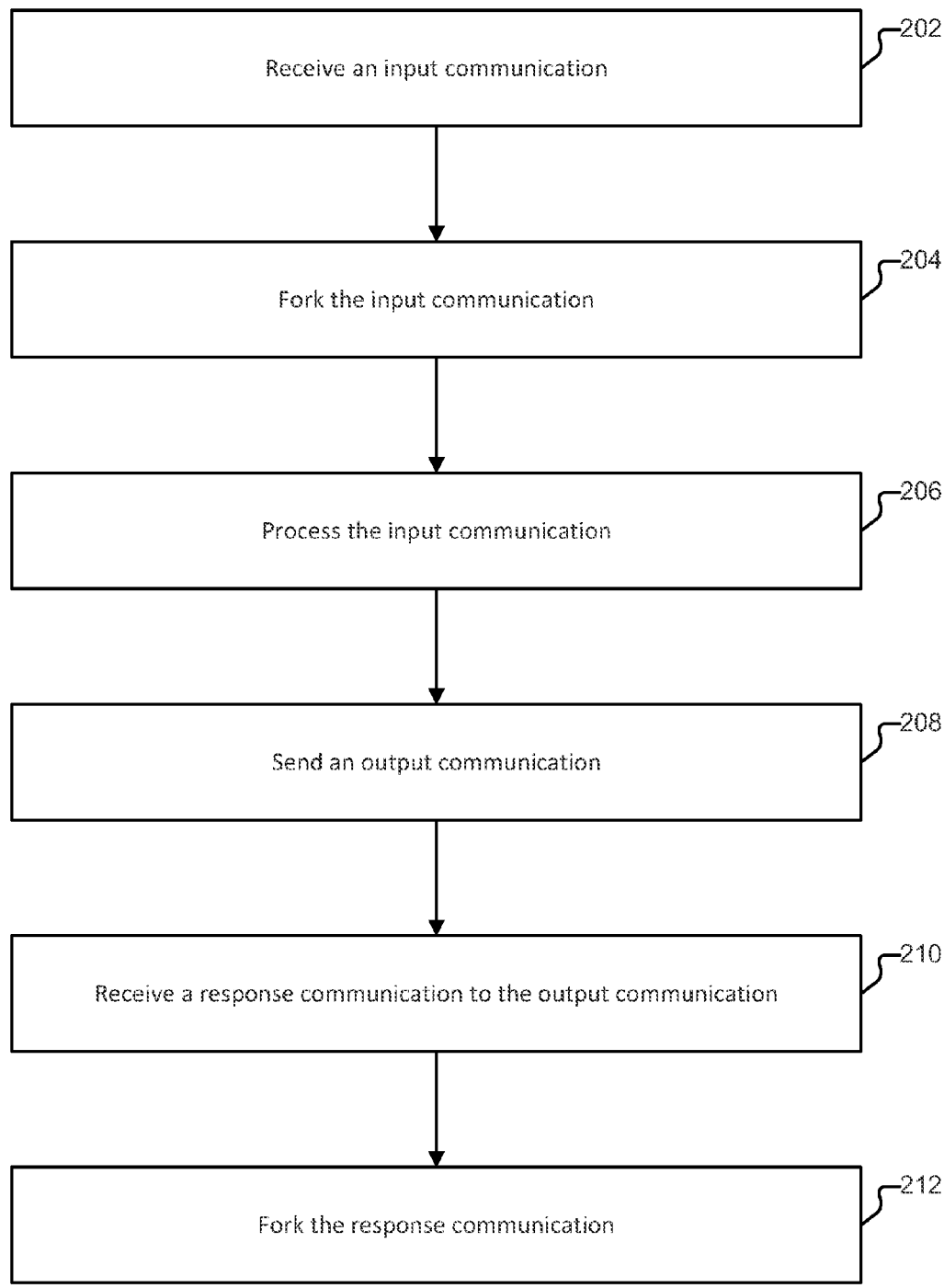
FIG. 2 is a flow chart illustrating an embodiment of a process for forking communication.

FIG. 2 is a flow chart illustrating an embodiment of a process for forking communication. The process of FIG. 2 may be at least in part implemented on deployed component 102 of FIG. 1.

At 202, an input communication is received. In some embodiments, the received input communication includes communication received from user system 106. A plurality of input communications from a plurality of user systems may be received. In some embodiments, the input communication includes one or more requests. Examples of the request include a content request, a service request, a network request, a database request, a communication request, and any other data request or command.

At 204, the input communication is forked. In some embodiments, forking communication includes providing the information to a plurality of destinations. For example, the input communication is intended for an intended destination and the communication is provided to one or more other destinations (e.g., a not originally intended destination such as a test component) in addition to the intended destination. In some embodiments, forking the communication includes copying the communication and forwarding the communication. In some embodiments, the communication is forked before the input communication is received at 202. For example, the input communication is forked by a source of the input communication and/or an intermediary. In some embodiments, forking the input communication includes determining whether the input communication is a communication that should be forked and only forking the communication if it is determined that the communication should be forked. For example, among a plurality of input communications from one or more senders, only input communication(s) associated with one or more determined user(s) and/or communication session(s) are forked. In some embodiments, forking the input communication includes determining which portion of the input communication is a communication to fork and only forking the determined portion of the communication. For example, only communication associated with one or more determined content and/or type is forked. In some embodiments, the input communication to be forked is determined dynamically. For example, input communication is forked until it is determined that a component being tested using the forked communication has received sufficient input communication to determine a test result (e.g., determined that a desired functionality and/or computer code to be tested has been covered using the forked communication). In some embodiments, the input communication is forked substantially in real-time as when the input communication is received and/or sent.

At 206, the input communication is processed. In some embodiments, processing the communication includes processing the input communication at a deployed component. For example, deployed component 102 processes a request to provide a data/service to user system 106 of FIG. 1. In some embodiments, processing the communication includes determining at least a portion of a result of the input communication that can be used to verify a result of a test component that is being tested using the forked input communication. For example, the input communication processed at 206 is also being processed by a test component that has received a forked version of the input communication and the results of both of the processing are compared to verify the result of the test component.

At 208, an output communication is sent. In some embodiments, processing the input communication requires providing data/service to another component. For example, at 208, an updated data is sent for processing/storage to a backend server such as backend system 108 of FIG. 1. In some embodiments, processing the input communication requires data and/or service from another component and the required data/service is requested at 208. For example, information from a backend server such as backend system 108 of FIG. 1 is required to process an input communication and the required information is requested at 208.

At 210, a response communication to the output communication is received. In some embodiments, the response communication is at least in part used to perform processing commenced at 206. In some embodiments, the response includes a requested data. In some embodiments, the response includes a confirmation that a requested processing has been successfully completed. In some embodiments, the response includes a confirmation that a sent data has been successfully received and/or processed.

At 212, the response communication is forked. In some embodiments, forking the response communication includes providing the response communication to a plurality of destinations. For example, the response communication is intended for an intended destination and the response communication is provided to one or more other destinations (e.g., a not originally intended destination such as a test component) in addition to the intended destination. In some embodiments, forking the response communication includes copying the response communication and forwarding the response communication. In some embodiments, the communication is forked before the response communication is received at 210. For example, the response communication is forked by a source of the response communication and/or an intermediary. In some embodiments, forking the response communication includes determining whether the response communication is a communication that should be forked and only forking the communication if it is determined that the communication should be forked. For example, only response communications associated with one or more determined users, communication sessions, and/or forked input communications (e.g., forked at 204) are forked. In some embodiments, forking the response communication includes determining which portion of the response communication is a communication that should be forked and only forking the determined portion of the communication. For example, only communications associated with one or more determined content and/or type are forked. In some embodiments, the response communication to be forked is determined dynamically. For example, a response communication is only forked if it is dynamically determined that the response communication corresponds to an input communication that was forked at 204. In some embodiments, the response communication is forked substantially in real-time as when the response communication is received and/or sent.

Figure 3:
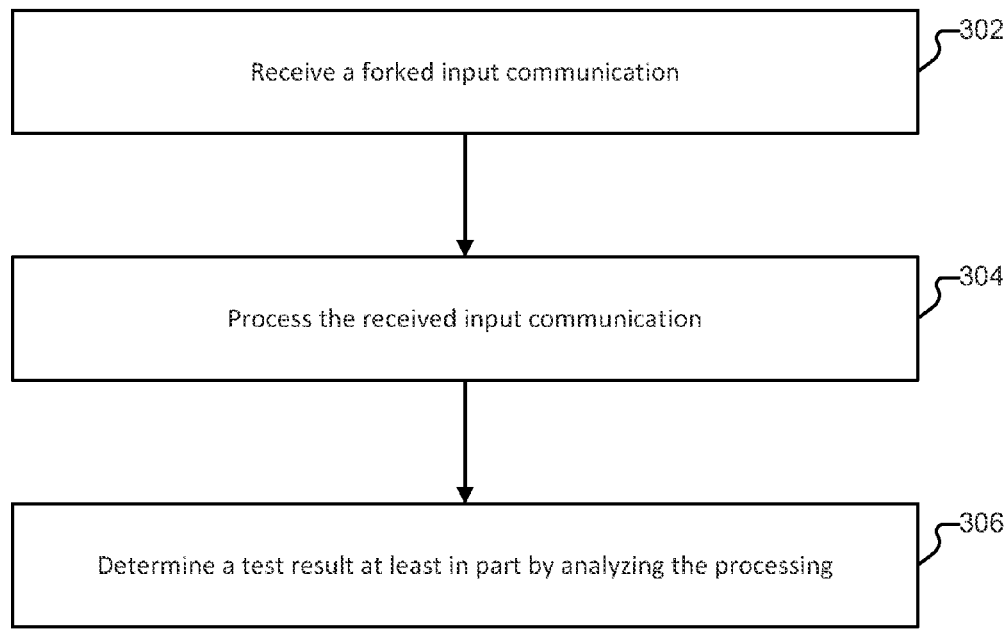
FIG. 3 is a flowchart illustrating an embodiment of a process for determining a test result.

FIG. 3 is a flowchart illustrating an embodiment of a process for determining a test result. At least a portion of the process of FIG. 3 may be implemented on test component 104 and/or verifier 110 of FIG. 1.

At 302, a forked input communication is received. In some embodiments, the received input communication includes input communication sent at 204 of FIG. 2. In some embodiments, the input communication has been received substantially in real-time as when the input communication is sent by a creator of the input communication and/or received by an originally intended destination. For example, when user system 106 sends an input communication to deployed component 102, the input communication is received at both deployed component 102 and forked to test component 104 substantially in real-time. In some embodiments, by receiving the input communication in real-time, a time value associated with the input communication remains valid. For example, if the input communication is a previously stored communication that has been provided at a later time, a timing value of the input communication is invalid and must be adjusted to compensate for the passage of time whereas if the input communication is received substantially in real-time, a timing value may remain valid.

At 304, the received input communication is processed. In some embodiments, processing in the input communication includes processing a processing request included in the input communication. In some embodiments, processing the input communication includes performing at a test component such as test component 104 of FIG. 1 using the received input communication to test the test component. In some embodiments, the processing performed at 304 is associated with processing performed at 206 of FIG. 2. For example, the same user request included in an input communication is processed in parallel at 304 and 206 of FIG. 2. In some embodiments, a result of processing performed at 206 of FIG. 2 can be used to verify the validity of a result of processing performed at 304. In various embodiments, processing the input communication includes providing and/or requesting data/services from one or more other components. For example, similar to step 208 of FIG. 2, output communication may be sent.

In some embodiments, the processing at 304 is performed in the context of testing a developmental test component that has been sandboxed to not affect other components and systems. Instead of sending the request/data from the test component to a deployed component system, the request/data may be sent to another test component, stored, analyzed, and/or discarded. In some embodiments, a response to a request/data sent due to processing performed at 304 is required to complete the processing at 304 in order to determine a test result. The required response may be provided from a forked response communication. For example, response communication forked at 212 of FIG. 2 is received at 304 for use during the processing. This may allow a request generated during the processing at 304 to be serviced without actually sending the request to a deployed system because an analogous deployed component has issued the same request and received a response that can be forked to the test component.

At 306, a test result is determined at least in part by analyzing the processing. In some embodiments, if it is determined that a complete test result (e.g., a complete set of test results) has not yet been achieved, the process returns to 302. For example, if it is determined that not all features/code of a test component has been tested, additional input communication is requested to be forked and the additional input communication is received at 302 for processing at 304. In some embodiments, a specific type of input communication may be requested to be forked in order to achieve a complete test result. In some embodiments, determining the test result includes comparing a result of the processing performed at 304 with a result of the processing performed in the process of FIG. 2. In various embodiments, the test result is associated with one or more of the following: a performance metric, a functionality indicator, a verification indicator, a correctness indicator, a tested code coverage, a log, an error log, and any other test output.

Figure 4:
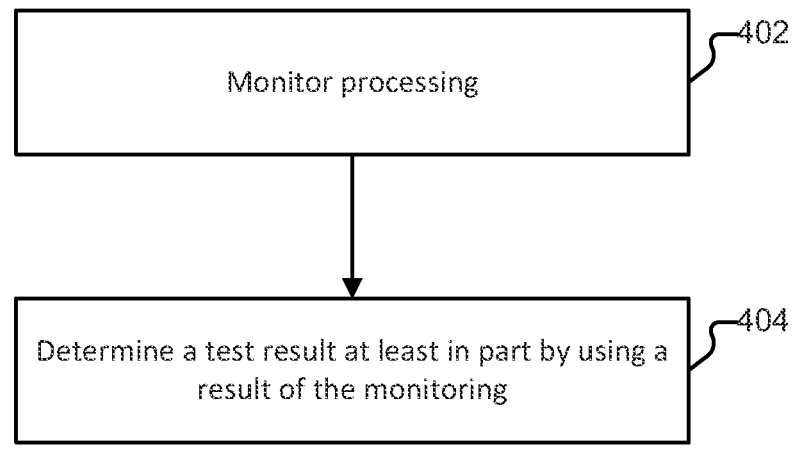
FIG. 4 is a flowchart illustrating an embodiment of a process for monitoring to determine a test result.

FIG. 4 is a flowchart illustrating an embodiment of a process for monitoring to determine a test result. In some embodiments, the process of FIG. 4 is included in 306 of FIG. 3. At least a portion of the process of FIG. 4 may be implemented on test component 104 and/or verifier 110 of FIG. 1.

At 402, processing is monitored. In some embodiments, monitoring the processing includes monitoring a process of a forked input communication at a test component such as test component 104 of FIG. 1. In some embodiments, the processing monitored at 402 includes the processing at 304 of FIG. 3. In some embodiments, monitoring the processing includes monitoring which functionality and/or code has been tested by performing the processing. For example, if it is determined that features/code of a test component has not been tested, additional input communication is requested to be forked for processing. In some embodiments, a specific type of input communication may be requested to fork in order to test a desired functionality/portion of code. In some embodiments, monitoring the processing includes determining a performance metric of the processing. For example, metric such as processor, memory, storage, and/or network utilization may be monitored.

At 404, a test result is determined at least in part by using a result of the monitoring. In some embodiments, the test result includes a log, a variable, a graph, a table and/or any other indictor of a result monitoring performed at 402. In some embodiments, the test result includes an indication of which functionality and/or code has been tested during a processing of an input communication. In some embodiments, the test result includes a visualization of a performance metric. The test result may be provided to a user and/or system for further analysis. In some embodiments, if the test result indicates a determined result, an indicator such as a message is provided.

Figure 5:
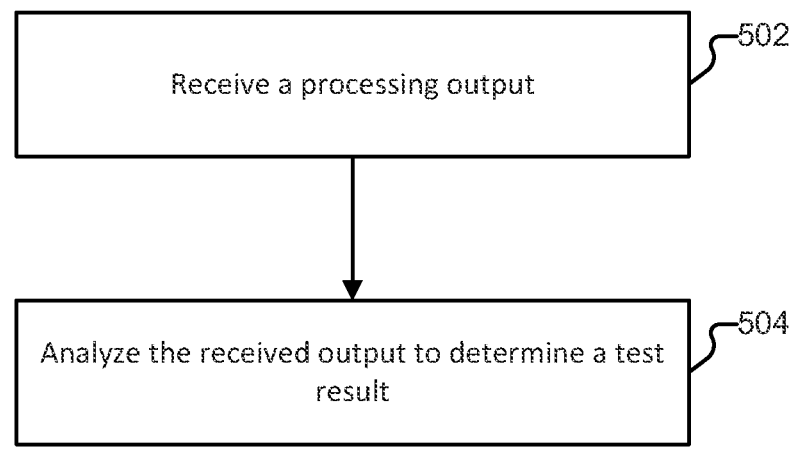
FIG. 5 is a flowchart illustrating an embodiment of a process for using a processing output to determine a test result.

FIG. 5 is a flowchart illustrating an embodiment of a process for using a processing output to determine a test result. In some embodiments, the process of FIG. 5 is included in 306 of FIG. 3. At least a portion of the process of FIG. 5 may be implemented on test component 104 and/or verifier 110 of FIG. 1.

At 502, a processing output is received. In some embodiments, receiving the processing output includes receiving a processing output of a forked input communication at a test component such as test component 104 of FIG. 1. In some embodiments, the output received at 502 includes the output of processing at 304 of FIG. 3. In some embodiments, data and/or requests provided during the processing of a forked input communication at a test component are intercepted for analysis. In some embodiments, a result (e.g., result data, log, acknowledgement message, etc.) of processing a forked input communication at a test component is received at 502. In some embodiments, the processing output is received at verifier 110 of FIG. 1.

At 504, the received output is analyzed to determine a test result. In some embodiments, analyzing the received output includes comparing at least a portion of the received output to an output of an analogous processing performed by a deployed component. For example, output of deployed component 102 of FIG. 1 from one or more steps of the process of FIG. 2 is compared with the received output to determine the test result. In some embodiments, if the comparison does not match, an error indicator is included in the test result. In some embodiments, analyzing the received output includes analyzing a log such as a processing log, a debugging log, and/or an error log to determine whether a test component has functioned as desired. In some embodiments, if the log includes information that indicates that the test component has not functioned as desired, an error indicator is included in the test result.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for testing a test component, comprising:
receiving at the test component, an input communication that has been forked from an input communication intended for a deployed component, wherein the test component and the deployed component are different components and the input communication intended for the deployed component has been forked including by allowing a copy of the input communication intended for the deployed component to arrive at the test component;
using a processor to process at least a portion of the received input communication; and
using a result of the processing to at least in part determine a test result of the test component.

2. The method of claim 1, wherein the received input communication has been selectively forked from a plurality of input communications.

3. The method of claim 2, wherein the received input communication has been selectively forked from the plurality of input communications based at least in part on one or more of the following: a user associated with the received input communication, and a network communication session associated with the received input communication.

4. The method of claim 1, wherein the received input communication has been received substantially in real-time as when the input communication intended for the deployed component was sent to the deployed component.

5. The method of claim 1, wherein determining the test result includes comparing the result of the processing with a result of processing by the deployed component.

6. The method of claim 1, further comprising requesting additional forked input communication to cover computer code that has not yet been tested by the already received input communication.

7. The method of claim 1, wherein the test component includes a server.

8. The method of claim 1, wherein the test component has been sandboxed from one or more systems connected to the deployed component.

9. A system for testing a test component, comprising:
a processor configured to:
receive at the test component, an input communication that has been forked from an input communication intended for a deployed component, wherein the test component and the deployed component are different components and the input communication intended for the deployed component has been forked including by allowing a copy of the input communication intended for the deployed component to arrive at the test component;
process at least a portion of the received input communication; and
use a result of the processing to at least in part determine a test result of the test component; and
a memory coupled with the processor, wherein the memory is configured to provide the processor with instructions.

10. The system of claim 9, wherein the received input communication has been selectively forked.

11. The system of claim 10, wherein the received input communication has been selectively forked from the plurality of input communications based at least in part on one or more of the following: a user associated with the received input communication, and a network communication session associated with the received input communication.

12. The system of claim 9, wherein the received input communication has been received substantially in real-time as when the input communication intended for the deployed component was sent to the deployed component.

13. The system of claim 9, wherein determining the test result includes comparing the result of the processing with a result of processing by the deployed component.

14. The system of claim 9, wherein the processor is further configured to request additional forked input communication to cover computer code that has not yet been tested by the already received input communication.

15. The system of claim 9, wherein the test component includes a server.

16. The system of claim 9, wherein the test component has been sandboxed from one or more systems connected to the deployed component.

17. A computer program product for testing a test component, the computer program product being embodied in a non-transitory computer readable storage medium and comprising computer instructions for:
receiving at the test component, an input communication that has been forked from an input communication intended for a deployed component, wherein the test component and the deployed component are different components and the input communication intended for the deployed component has been forked including by allowing a copy of the input communication intended for the deployed component to arrive at the test component;
processing at least a portion of the received input communication; and
using a result of the processing to at least in part determine a test result of the test component.

18. The computer program product of claim 17, wherein the received input communication has been received substantially in real-time as when the input communication intended for the deployed component was sent to the deployed component.

19. The computer program product of claim 17, wherein determining the test result includes comparing the result of the processing with a result of processing by the deployed component.

20. The computer program product of claim 17, further comprising computer instructions for requesting additional forked input communication to cover computer code that has not yet been tested by the already received input communication.

* * * * *